United States Patent
Gavade et al.

(10) Patent No.: US 9,967,635 B2
(45) Date of Patent: May 8, 2018

(54) DELIVERY CONFIRMATION AND NON-LIVE DELIVERY OF EMERGENCY ALERT SYSTEM MESSAGES

(71) Applicant: Verizon Patent and Licensing Inc., Arlington, VA (US)

(72) Inventors: Sameer Gavade, Irving, TX (US); Venkata S. Adimatyam, Irving, TX (US); Tariq Roshan, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

(21) Appl. No.: 14/462,984

(22) Filed: Aug. 19, 2014

(65) Prior Publication Data

US 2016/0057505 A1 Feb. 25, 2016

(51) Int. Cl.
*H04N 21/433* (2011.01)
*H04N 21/81* (2011.01)
*H04N 21/231* (2011.01)
*H04N 21/426* (2011.01)
*H04N 21/442* (2011.01)
*H04N 21/488* (2011.01)

(52) U.S. Cl.
CPC ..... *H04N 21/814* (2013.01); *H04N 21/23106* (2013.01); *H04N 21/42684* (2013.01); *H04N 21/4331* (2013.01); *H04N 21/44231* (2013.01); *H04N 21/4882* (2013.01)

(58) Field of Classification Search
CPC ............... H04N 21/814; H04N 21/433; H04N 21/4331–21/4335; H04N 21/44231; H04N 21/4882

USPC .......................................................... 725/33
See application file for complete search history.

(56) References Cited

U.S. PATENT DOCUMENTS

| 7,738,771 B1 * | 6/2010 | Bayer | H04N 21/4882 |
| | | | 386/323 |
| 2002/0090198 A1 * | 7/2002 | Rosenberg | H04N 21/4331 |
| | | | 386/228 |

(Continued)

OTHER PUBLICATIONS

Wikipedia, "Emergency Alert System", http://en.wikipedia.org/wiki/Emergency_Alert_System, Aug. 17, 2014, 15 pages.

(Continued)

*Primary Examiner* — Pankaj Kumar
*Assistant Examiner* — Alexander Boyd

(57) ABSTRACT

A device may detect an emergency alert system message. The emergency alert system message may include a message to be provided for consumption by multiple users. The device may determine that the emergency alert system message has not been successfully delivered for consumption by a user. The device may store the emergency alert system message, for future delivery, based on determining that the emergency alert system message has not been successfully delivered for consumption by the user. The device may receive an indication to provide the emergency alert system message after storing the emergency alert system message. The device may provide the emergency alert system message, for consumption by the user, based on receiving the indication to provide the emergency alert system message.

20 Claims, 13 Drawing Sheets

(56) References Cited

U.S. PATENT DOCUMENTS

| | | | | | |
|---|---|---|---|---|---|
| 2004/0152493 | A1* | 8/2004 | Phillips | G08B 27/005 | 455/567 |
| 2005/0100322 | A1* | 5/2005 | Kikuchi | H04N 21/814 | 386/243 |
| 2007/0275690 | A1* | 11/2007 | Hunter | G09F 27/00 | 455/404.2 |
| 2008/0216113 | A1* | 9/2008 | Yun | H04H 20/59 | 725/33 |
| 2009/0133056 | A1* | 5/2009 | Yun | H04H 20/59 | 725/33 |
| 2009/0282434 | A1* | 11/2009 | Yasuho | H04N 21/4882 | 725/33 |
| 2010/0075591 | A1* | 3/2010 | Eyer | H04H 20/59 | 455/3.01 |
| 2010/0138858 | A1* | 6/2010 | Velazquez | H04N 21/814 | 725/33 |
| 2010/0211971 | A1* | 8/2010 | Howarter | H04N 21/4334 | 725/33 |
| 2011/0202956 | A1* | 8/2011 | Connelly | H04N 21/433 | 725/38 |
| 2011/0316666 | A1* | 12/2011 | Noma | G06F 21/32 | 340/5.53 |
| 2012/0126976 | A1* | 5/2012 | Bugenhagen | G08B 25/08 | 340/540 |
| 2014/0033255 | A1* | 1/2014 | Daly | H04N 21/4788 | 725/37 |
| 2014/0143802 | A1* | 5/2014 | Hamada | H04N 21/814 | 725/33 |
| 2014/0282704 | A1* | 9/2014 | Tumuluru | H04N 21/4882 | 725/33 |
| 2015/0058882 | A1* | 2/2015 | Jayamanne | H04N 21/814 | 725/33 |

OTHER PUBLICATIONS

Federal Communications Commission, "Emergency Alert System", http://transition.foc.gov/pshs/services/eas/, 2010, 2 pages.

* cited by examiner

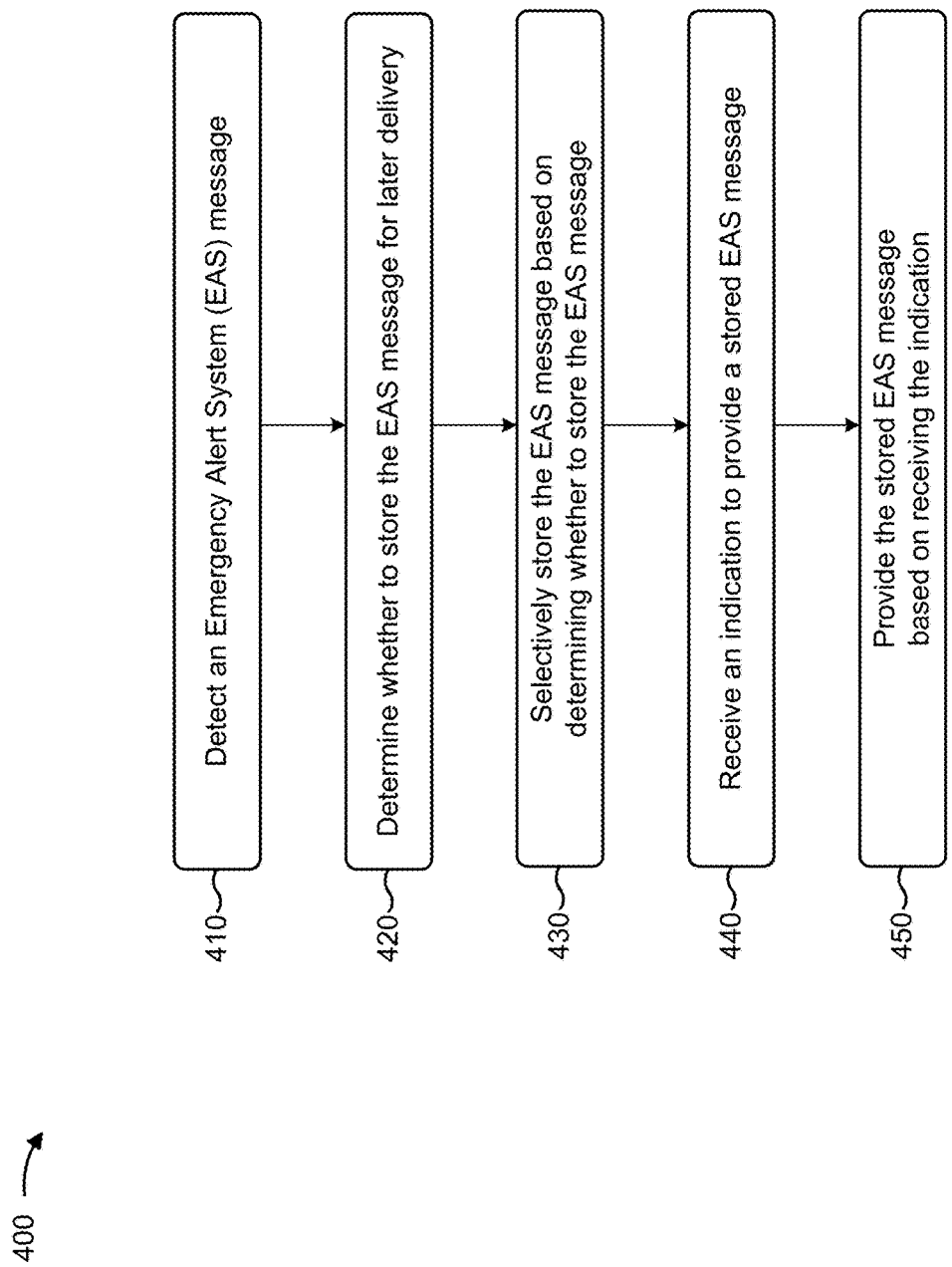

DELIVERY CONFIRMATION AND NON-LIVE DELIVERY OF EMERGENCY ALERT SYSTEM MESSAGES

BACKGROUND

The Emergency Alert System (EAS) is a national public warning system in the United States that requires broadcasters, cable television systems, wireless cable systems, satellite digital audio radio service (SDARS) providers, and direct broadcast satellite (DBS) providers to provide communications capability to the President of the United States to address the American public during a national emergency. In addition to this requirement, EAS may also be used by state and local authorities to deliver important emergency information, such as missing person alerts and weather information targeted to specific areas.

BRIEF DESCRIPTION OF THE DRAWINGS

FIG. 4 is a flow chart of an example process for providing a stored EAS message after initial delivery of the EAS message;

DETAILED DESCRIPTION OF PREFERRED EMBODIMENTS

The following detailed description of example implementations refers to the accompanying drawings. The same reference numbers in different drawings may identify the same or similar elements.

The Emergency Alert System (EAS) is designed to alert the public of emergencies. Such alerts may be provided by the delivery of an EAS message via a communications medium, such as cable television, radio, satellite television, or the like. The EAS message may be played or displayed live as the EAS message is delivered (e.g., may be played over or displayed on top of live content). However, a user may miss an EAS message if the user is not consuming media when the EAS message is delivered. For example, the user may miss an EAS message delivered via cable television if the user is not watching cable television when the EAS message is delivered. Thus, the user may miss important alerts. Implementations described herein assist in storing EAS messages so that an EAS message may be delivered for consumption by a user after the EAS message was initially delivered. Furthermore, implementations described herein assist in providing delivery confirmation for EAS messages. In this way, important EAS messages may reach more users.

Figure 1A:
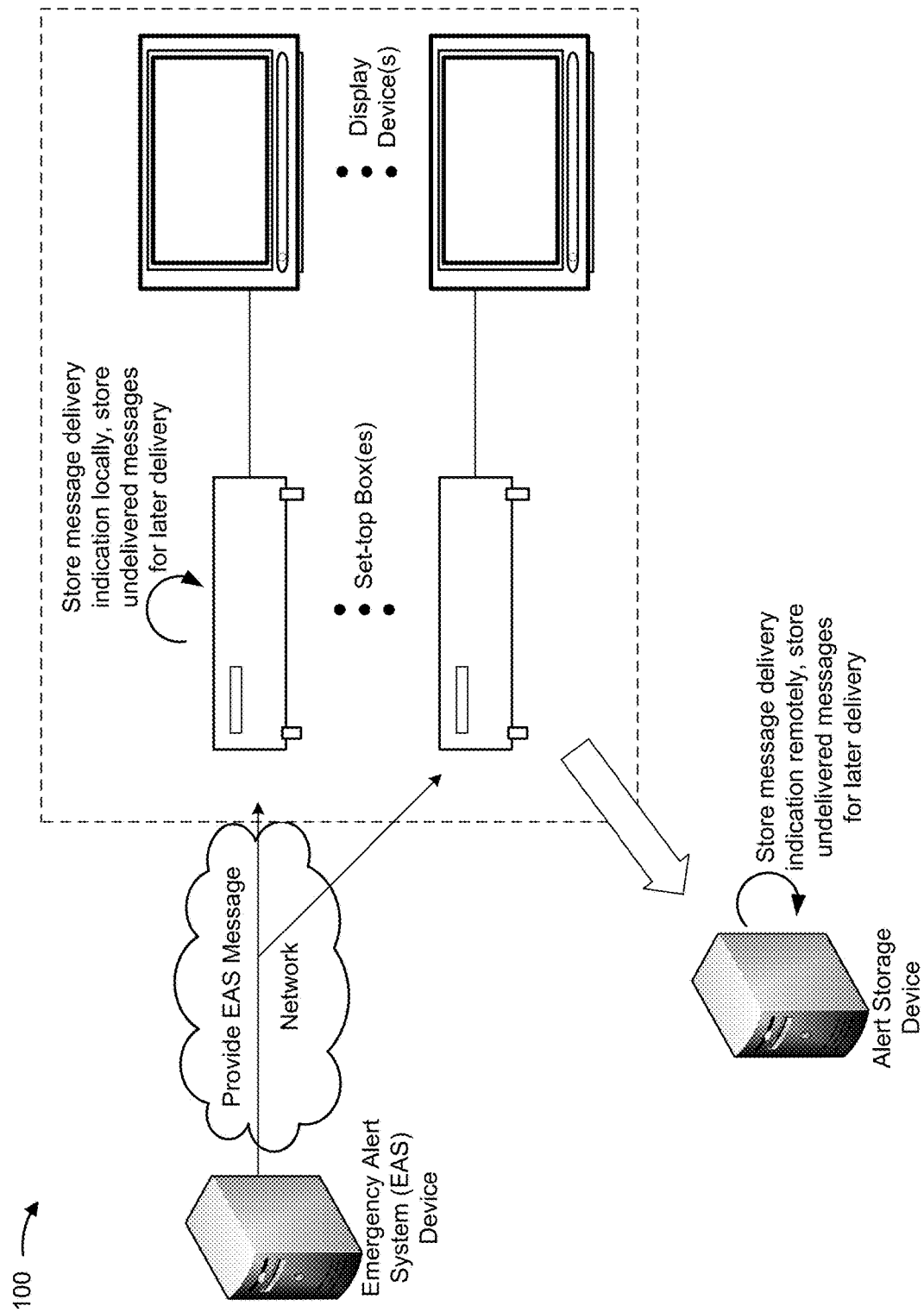
FIGS. 1A and 1B are diagrams of an overview of an example implementation described herein.
Figure 1B:
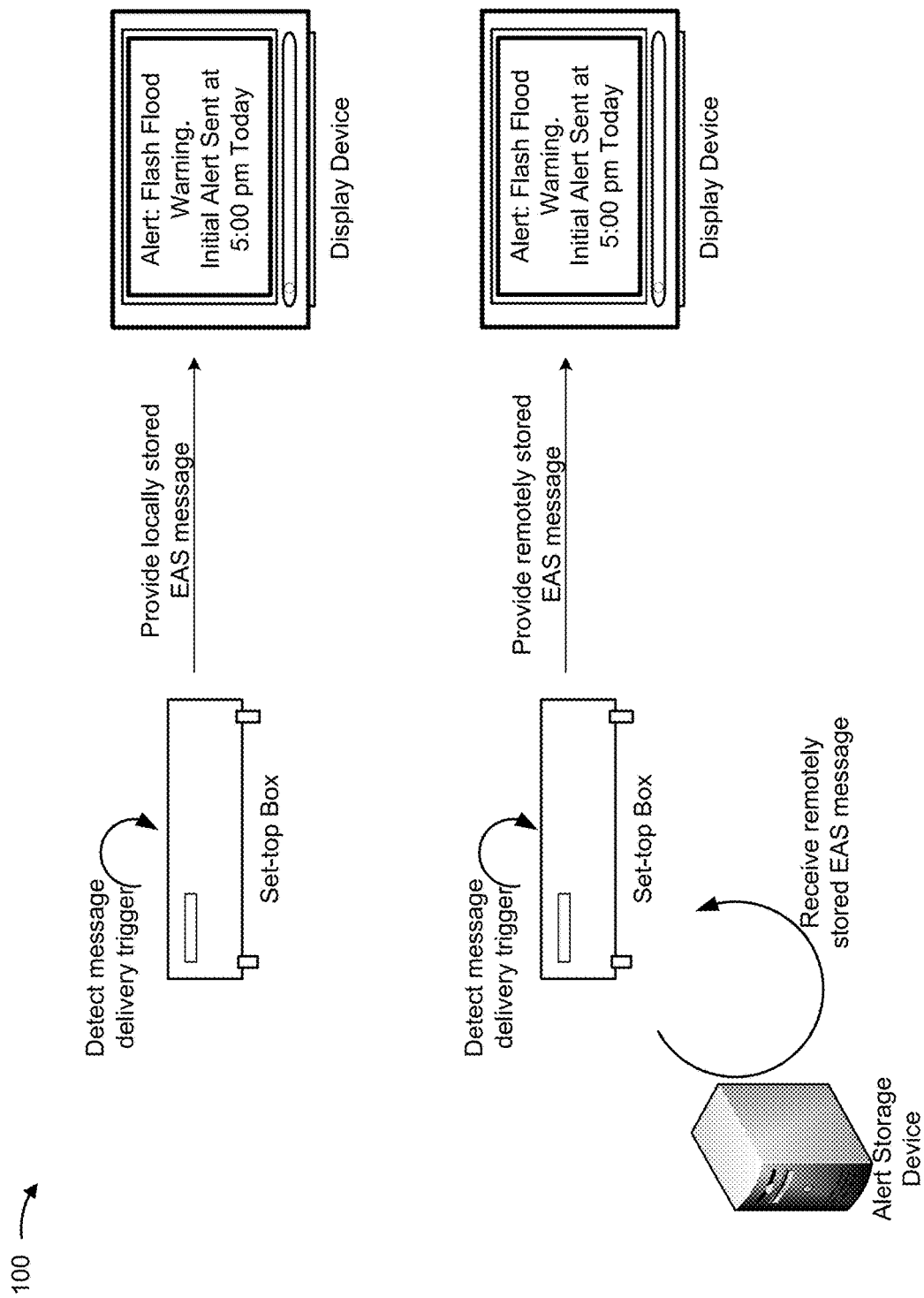

FIGS. 1A and 1B are diagrams of an overview of an example implementation 100 described herein. As shown in FIG. 1A, assume that an EAS device (e.g., a server device, a network device, etc.) provides an EAS message, via a network, to a set of set-top boxes. As further shown, a set-top box may store a message delivery indication locally, and may store undelivered messages for later delivery. Additionally, or alternatively, an alert storage device (e.g., a server device in the network) may store a message delivery indication remotely (e.g., remotely from the set-top box), and may store undelivered messages for later delivery. The message delivery indication may indicate whether an EAS message (or another type of message) was successfully delivered for consumption by a user (e.g., whether the message was provided to a display device, such as a television), as described in more detail elsewhere herein.

As shown in FIG. 1B, a set-top box may detect a message delivery trigger, and may provide a locally stored EAS message for consumption by a user. For example, the set-top box may provide the stored EAS message to a display device, such as a television, for display. Additionally, or alternatively, the set-top box may detect a message delivery trigger, may receive a remotely stored EAS message from the alert storage device, and may provide the EAS message to the display device. The message delivery trigger may indicate that a user, who was not previously consuming media in a manner that permits delivery of the EAS message, is now consuming media in a manner that permits delivery of the EAS message, as described in more detail elsewhere herein. For example, the set-top box may detect the message delivery trigger when a user powers on a display device. By delivering EAS messages for consumption by users who did not consume the EAS messages upon initial delivery, a larger quantity of users may be alerted to emergency situations.

Figure 2:
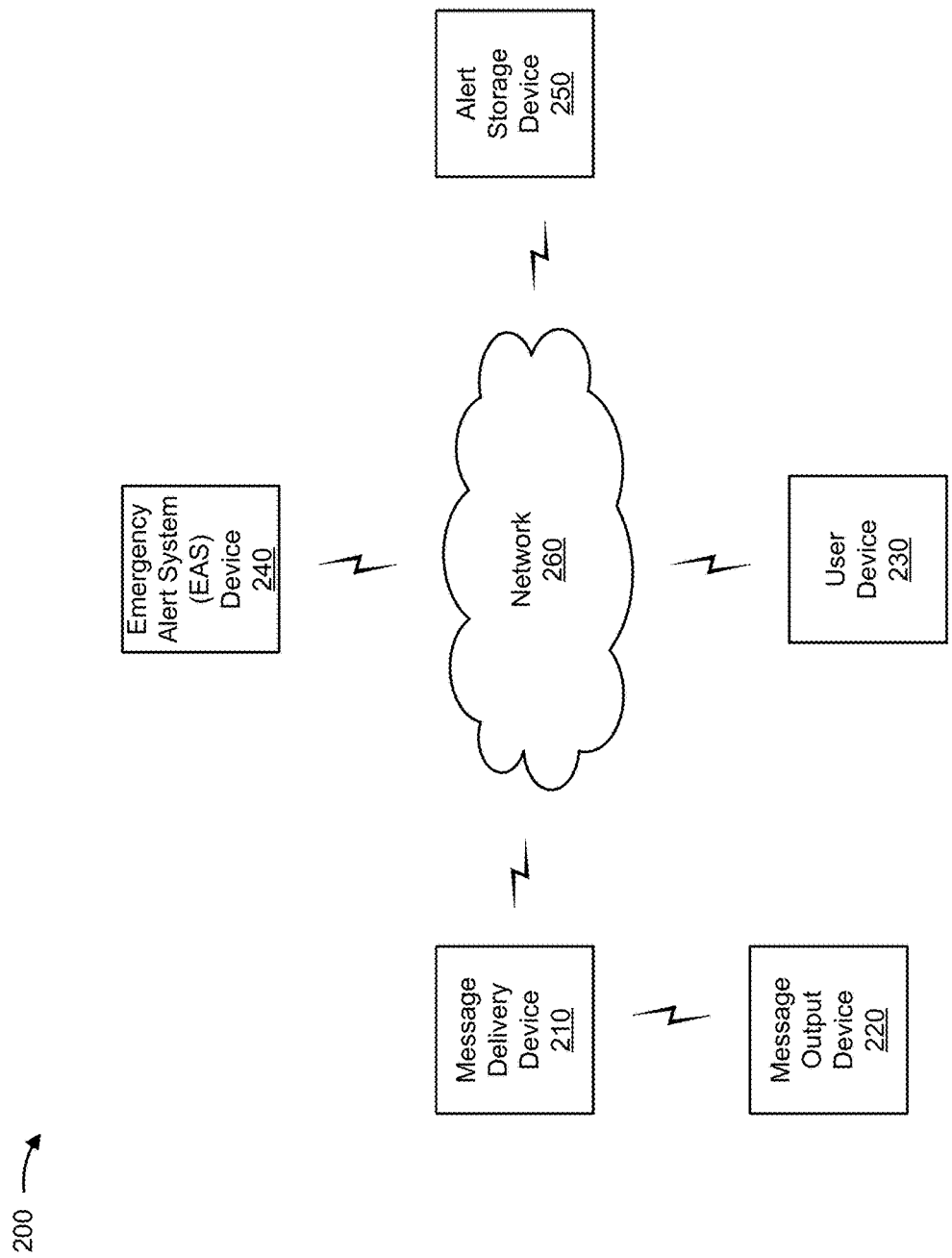
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a message delivery device 210, a message output device 220, a user device 230, an EAS device 240, an alert storage device 250, and a network 260. Devices of environment 200 may interconnect via wired connections, wireless connections, or a combination of wired and wireless connections.

Message delivery device 210 may include one or more devices capable of receiving, storing, processing, and/or providing media content and/or message information (e.g., associated with an EAS message, another type of message, etc.). For example, message delivery device 210 may include a set-top box, a casting stick (e.g., a high-definition media interface (HDMI) dongle), a computer, a cable card, a gaming device, a portable electronic device, a radio, a receiver, a head unit (e.g., a radio head unit), a television, or a similar type of device. In some implementations, message delivery device 210 may receive, store, process, and/or provide a message (e.g., an EAS message and/or another type of message). For example, message delivery device 210 may receive an EAS message from EAS device 240, and may provide the EAS message to message output device 220 for consumption by a user. Message delivery device 210 may store undelivered messages for later delivery. In some implementations, message delivery device 210 may interact with alert storage device 250 to handle message storage and/or delivery.

Message output device 220 may include one or more devices capable of receiving, processing, and/or providing media content and/or message information. For example, message output device 220 may include a television, a computer monitor, a smart phone, a tablet, a radio, a speaker, or a similar type of device. Message output device 220 may receive a message (e.g., an EAS message), and may output the message. In some implementations, message output device 220 may receive the message from message delivery device 210. Additionally, or alternatively, message output device 220 may receive the message from EAS device 240, alert storage device 250, or the like.

User device 230 may include one or more devices capable of receiving, generating, storing, processing, and/or providing message information. For example, user device 230 may include a communications and/or computing device, such as a mobile phone (e.g., a smart phone, a radiotelephone, etc.), a laptop computer, a tablet computer, a handheld computer, a gaming device, or a similar type of device. In some implementations, user device 230 may receive, process, store, and/or provide messages (e.g., EAS message) for consumption by a user.

EAS device 240 may include one or more devices capable of generating and/or providing messages. For example, EAS device 240 may include a computing device, such as a server device, a network device, a desktop computer, a laptop computer, or the like. EAS device 240 may provide EAS messages to message delivery device 210 and/or user device 230.

Alert storage device 250 may include one or more devices capable of receiving, storing, processing, and/or providing messages. For example, alert storage device 250 may include a computing device, such as a server device or a similar type of device. Alert storage device 250 may store message information associated with messages, and may assist in delivering undelivered messages.

Network 260 may include one or more wired and/or wireless networks. For example, network 260 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
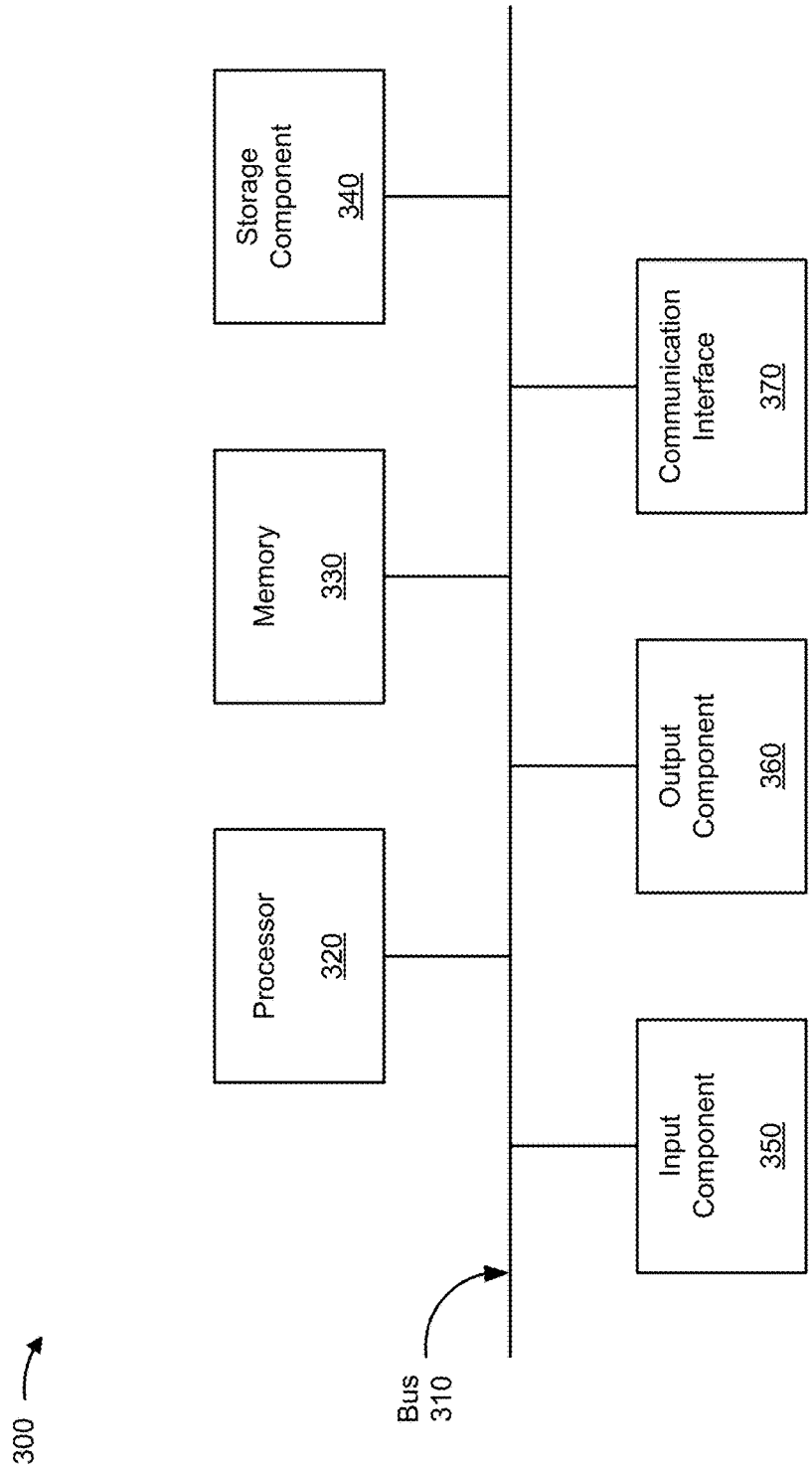
FIG. 3 is a diagram of example components of one or more devices of FIG. 2.

FIG. 3 is a diagram of example components of a device 300. Device 300 may correspond to message delivery device 210, message output device 220, user device 230, EAS device 240, and/or alert storage device 250. In some implementations, message delivery device 210, message output device 220, user device 230, EAS device 240, and/or alert storage device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing a stored EAS message after initial delivery of the EAS message. In some implementations, one or more process blocks of FIG. 4 may be performed by message delivery device 210. Additionally, or alternatively, one or more process blocks of FIG. 4 may be performed by another device or a group of devices separate from or including message delivery device 210, such as message output device 220, user device 230, EAS device 240, and/or alert storage device 250.

As shown in FIG. 4, process 400 may include detecting an Emergency Alert System (EAS) message (block 410). For example, message delivery device 210 may detect an EAS message (or another type of message). In some implementations, EAS device 240 may transmit an EAS message, via network 260, and message delivery device 210 may receive the EAS message. Additionally, or alternatively, alert storage device 250 may detect an EAS message (e.g., an EAS message transmitted by EAS device 240). Additionally, or alternatively, user device 230 may detect the EAS message. The EAS message may include an alert message, a message associated with an emergency, or the like. For example, the EAS message may include a weather alert, a crime alert, a missing person alert, a news alert, a political alert, or the like. The EAS message may be broadcast for consumption by a large population of users, such as the general public (e.g., in a particular geographical area).

As further shown in FIG. 4, process 400 may include determining whether to store the EAS message for later delivery (block 420). For example, message delivery device 210 may determine whether to store the EAS message for later delivery. In some implementations, message delivery device 210 may determine whether the EAS message was successfully delivered. For example, message delivery device 210 may receive a message delivery indication that indicates whether the EAS message was successfully delivered. Message delivery device 210 may store the EAS message (and information associated with the EAS message) when the EAS message was not successfully delivered. In some implementations, message delivery device 210 may not store the EAS message when the EAS message was successfully delivered.

In some implementations, message delivery device 210 may determine whether to store the EAS message based on whether message output device 220 delivered and/or presented (e.g., via video, audio, text, etc.) the EAS message (e.g., whether the message was played, output, provided, etc.). For example, message output device 220 may not deliver the EAS message when message output device 220 is powered off. Additionally, or alternatively, message output device 220 may not deliver the EAS message when message output device 220 is not providing live content, such as when message output device is delivering pre-recorded content (e.g., via a digital video recorder (DVR)). Additionally, or alternatively, message output device 220 may not deliver the EAS message when there is an error associated with the EAS message and/or message output device 220. In these cases, message delivery device 210 may determine that the EAS message was not delivered, and may store the EAS message for later delivery.

In some implementations, message delivery device 210 may determine whether an EAS message was successfully delivered based on a user proximity to message delivery device 210 and/or message output device 220. For example, message delivery device 210 may determine whether user device 230 is within a particular proximity of message delivery device 210 (e.g., within communicative proximity via a wireless network, such as Wi-Fi, via a near-field communication network, such as Bluetooth, etc.). If user device 230 is not within proximity, then message delivery device 210 may determine that the EAS message was not successfully delivered. Conversely, if user device 230 is within proximity, then message delivery device 210 may determine that the EAS message was successfully delivered.

Additionally, or alternatively, message delivery device 210 may determine whether an EAS message was successfully delivered based on sensing that a user is within proximity of message delivery device 210 and/or message output device 220. For example, message delivery device 210 and/or message output device 220 may be equipped with one or more sensors (e.g., a motion sensor, a camera, a microphone, etc.) to determine whether a user is within proximity of message delivery device 210 and/or message output device 220 when an EAS message is delivered (e.g., presented). A user may opt in or opt out of such sensor detection.

Message delivery device 210 may provide a delivery confirmation request to message output device 220, in some implementations. In this case, message output device 220 may provide a delivery confirmation prompt (e.g., for display). A user may interact with the delivery confirmation prompt (e.g., by using a remote control, by clicking on the prompt, etc.) to confirm that the user viewed the EAS message. Message delivery device 210 may determine whether the EAS message was successfully delivered based on the user interaction. For example, if the user indicates that the user received the EAS message, then message delivery device 210 may determine not to store the EAS message for later delivery. If the user indicates that the user did not receive the EAS message, or if the user fails to interact with the delivery prompt within a particular time period, then message delivery device 210 may determine to store the EAS message for later delivery.

In some implementations, user device 230 may determine whether to store the EAS message for later delivery. For example, user device 230 may provide content and/or messages (e.g., in a similar manner as described above with respect to message delivery device 210 and/or message output device 220), and may determine whether to store the EAS message for later delivery as described above.

Alert storage device 250 may determine whether to store the EAS message for later delivery, in some implementations. For example, alert storage device 250 may receive, from message delivery device 210 and/or user device 230, a message delivery indication that indicates whether the EAS message was successfully delivered. For example, alert storage device 250 may receive an indication that message delivery device 210 and/or user device 230 was powered off when the EAS message was delivered, and may determine to store the EAS message for later delivery based on this indication.

In some implementations, alert storage device 250, message delivery device 210, and/or user device 230 may determine to store all received EAS messages (e.g., based on a configuration setting indicating that all EAS messages are to be stored). Additionally, or alternatively, alert storage device 250, message delivery device 210, and/or user device 230 may store EAS messages based on a condition being satisfied (e.g., EAS messages with a particular attribute, EAS messages delivered during a particular time frame, undelivered EAS messages, etc.).

As further shown in FIG. 4, process 400 may include selectively storing the EAS message based on determining whether to store the EAS message (block 430). For example, message delivery device 210, user device 230, and/or alert storage device 250 may determine to store the EAS message when the EAS message was not successfully delivered for consumption by a user (e.g., for presentation to the user). In some implementations, message delivery device 210 may store EAS messages that were not successfully delivered for consumption by a set of users associated with message delivery device 210 (e.g., a user registered for a cable television service provided by message delivery device 210). Similarly, user device 230 may store EAS messages that were not successfully delivered for consumption by a set of users associated with user device 230 (e.g., a user registered for a cellular phone service provided by user device 230).

Alert storage device 250 may store EAS messages associated with a set of message delivery devices 210 and/or a set of user devices 230. For example, for a particular EAS message, alert storage device 250 may store the EAS message (e.g., the contents of the message), may store information that identifies message delivery devices 210 and/or user devices 230 that did not successfully deliver the EAS message, and/or may store information that identifies message delivery devices 210 and/or user devices 230 that successfully delivered the EAS message. For example, alert storage device 250 may store an association between a device identifier (e.g., a network address, a serial number, etc.) and an EAS message, and may store a message delivery indicator that indicates whether the EAS message was successfully delivered by the device identified by the device identifier. Additionally, or alternatively, alert storage device 250 may store an association between a user identifier (e.g., a username, an account number, etc.) and an EAS message, and may store a message delivery indicator that indicates whether the EAS message was successfully delivered for consumption by the user identified by the user identifier.

As an example, a user may be associated with a combination of two or more message delivery devices 210, message output devices 220, and/or user devices 230 (e.g., multiple set-top boxes, multiple user devices 230, a set-top box and a user device 230, a set-top box and a gaming device, etc.). In this case, alert storage device 250 may store an indication of whether the EAS message was successfully delivered to a user by at least one device. When the EAS message was successfully delivered to the user by at least one device, alert storage device 250 may store an indication not to provide the EAS message to another device associated with the user (e.g., because the user has already viewed the EAS message), even if EAS delivery to the other device was not successful.

Additionally, or alternatively, message delivery device 210, user device 230, and/or alert storage device 250 may store message information associated with an EAS message. The message information may include, for example, the contents of the EAS message, a message identifier that identifies the EAS message, a date and/or time associated with the EAS message (e.g., a date/time that the EAS message was initially delivered, a date/time of an attempted redelivery of the EAS message, a date/time that the EAS message was stored, etc.), a type of the EAS message (e.g., a weather alert, a news alert, a political alert, etc.), information that indicates a length of time that the EAS message is to be retained in storage, or the like.

As further shown in FIG. 4, process 400 may include receiving an indication to provide a stored EAS message (block 440). For example, message delivery device 210, user device 230, and/or alert storage device 250 may receive an indication to provide (e.g., to deliver) a stored EAS message. In some implementations, one of these devices may detect a message delivery trigger based on a message delivery condition being satisfied.

As an example, message delivery device 210 may determine (e.g., may detect, may receive an indication, etc.) that message output device 220 has been powered on, has been switched and/or triggered to provide live content (e.g., has switched from providing DVR content to live content), or the like. Live content may include, for example, content that is being presented as the content is broadcast (or multicast, unicast, etc.), such as a real-time television program, a radio broadcast, etc. As another example, message delivery device 210 may determine that a user has interacted with message output device 220 to request delivery of an EAS message. For example, a user may interact with a message delivery prompt to request delivery of an EAS message (e.g., a particular EAS message, an undelivered EAS message, all undelivered EAS messages, etc.), and message delivery device 210 may receive an indication of the user interaction.

Similarly, user device 230 may determine that user device 230 has been powered on, may determine that user device 230 has been switched to provide live content (e.g., has switched from providing prerecorded content to streaming content), may detect a user interaction with user device 230 to request a stored EAS message, or the like.

In some implementations, alert storage device 250 may receive an indication, from message delivery device 210 and/or user device 230, to provide the stored EAS message. For example, message delivery device 210 and/or user device 230 may detect a message delivery trigger as described above. Based on detecting the message delivery trigger, message delivery device 210 and/or user device 230 may request a stored EAS message from alert storage device 250.

In some implementations, message delivery device 210 may receive an indication to provide an EAS message when user device 230 is within communicative proximity of message delivery device 210. For example, when an EAS message is not successfully delivered to message output device 220, message delivery device 210 may provide the message to user device 230 (e.g., via a network). In some implementations, message delivery device 210 may provide the message to user device 230 when user device 230 is within communicative proximity of message delivery device 210. Additionally, or alternatively, message delivery device 210 may provide an indication that an EAS message was not successfully delivered (e.g., to message output device 220), and/or that a user has EAS messages waiting to be consumed.

As further shown in FIG. 4, process 400 may include providing the stored EAS message based on receiving the indication (block 450). For example, message delivery device 210 may provide the stored EAS message (e.g., to message output device 220) for consumption by a user. Additionally, or alternatively, user device 230 may provide the stored EAS message for output (e.g., on a display, via a speaker, etc.). Additionally, or alternatively, alert storage device 250 may provide the stored EAS message to message delivery device 210 and/or user device 230 for delivery.

As described above, message delivery device 210 and/or user device 230 may store EAS messages locally. In this case, message delivery device 210 may obtain the EAS message from local storage (e.g., a locally stored data structure), and may provide the locally stored EAS message for delivery. Additionally, or alternatively, alert storage device 250 may store EAS messages remote from message delivery device 210 and/or user device 230. In this case, message delivery device 210 and/or user device 230 may request an EAS message from alert storage device 250, and alert storage device 250 may provide the requested EAS message to message delivery device 210 and/or user device 230. Message delivery device 210 and/or user device 230 may deliver the received EAS message. The EAS message may be presented for display in front of and/or in connection with other content, such as live content. Additionally, or alternatively, audio associated with live content may be muted or turned down to play audio associated with the EAS message.

In this way, a user may consume an EAS message after the EAS message was initially delivered. For example, a user may power on a television five minutes after an important EAS message was delivered, thus missing the message. Implementations described herein allow the user to consume this message and be warned of important alerts even if the user misses the initial alert.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
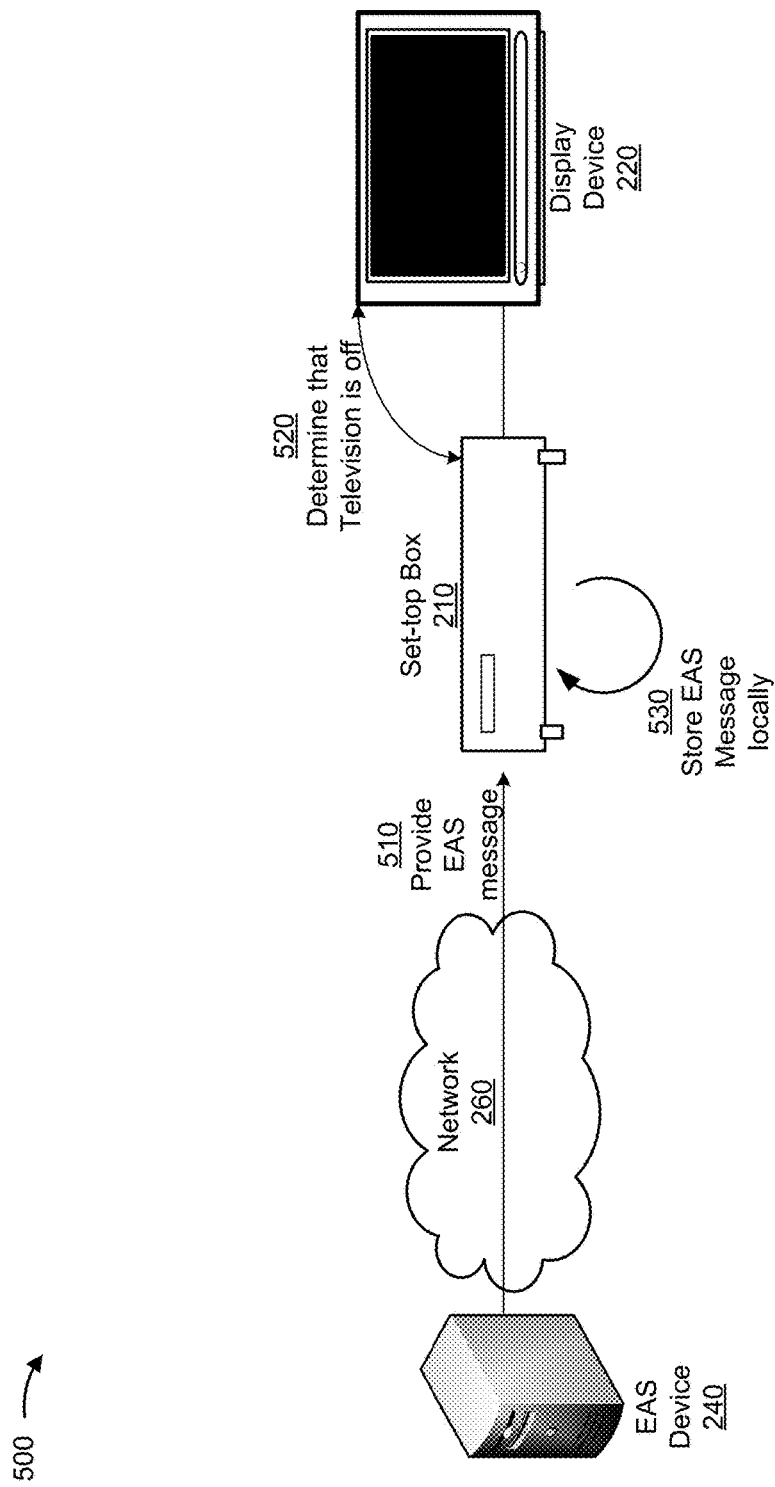
FIGS. 5A and 5B are diagrams of an example implementation relating to the example process shown in FIG. 4.
Figure 5B:
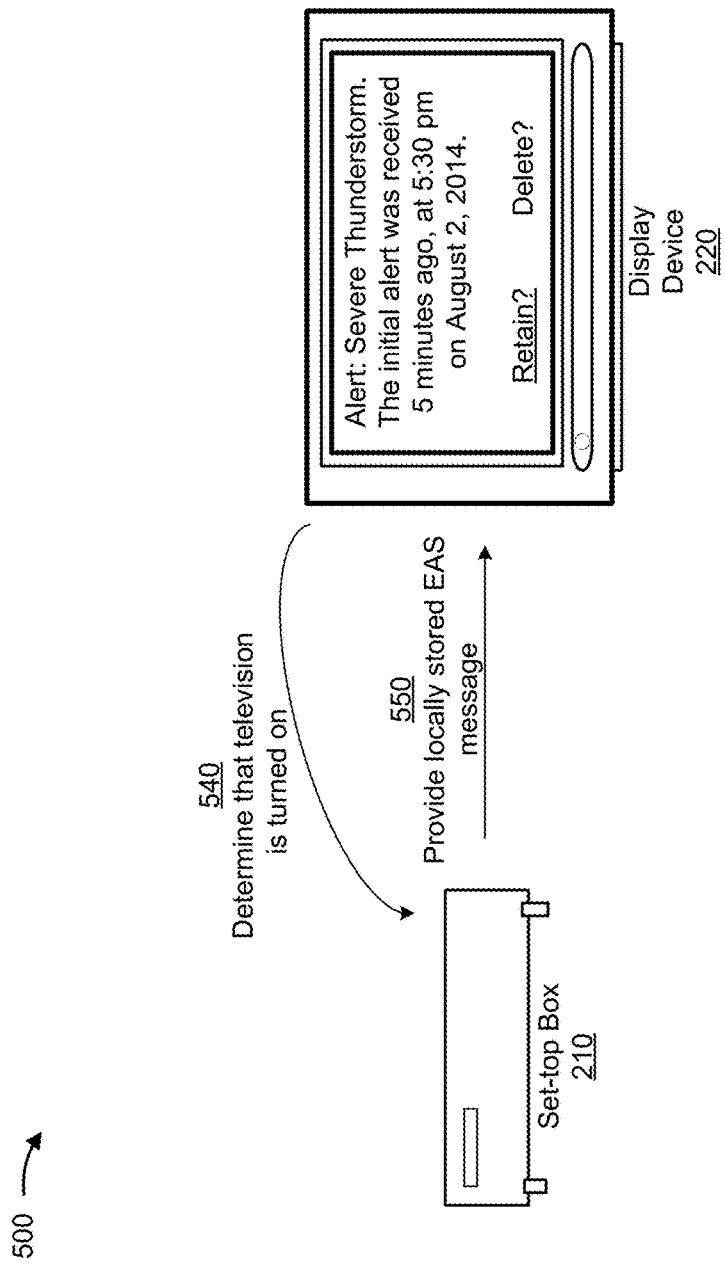

FIGS. 5A and 5B are diagrams of an example implementation 500 relating to example process 400 shown in FIG. 4. FIGS. 5A and 5B show an example of providing a stored EAS message after initial delivery of the EAS message.

As shown in FIG. 5A, and by reference number 510, assume that EAS device 240 provides an EAS message to set-top box 210 (e.g., a type of message delivery device 210). As shown by reference number 520, assume that display device 220, a television (e.g., a type of message output device 220), is powered off, and that set-top box 210 determines that display device 220 is powered off. Based on determining that display device 220 is powered off, set-top box 210 stores the EAS message locally, as shown by reference number 530.

As shown in FIG. 5B, and by reference number 540, assume that, at a later time, set-top box 210 determines that display device 220 is powered on. Based on determining that display device 220 is powered on, set-top box 210 provides the locally stored EAS message to display device 220, as shown by reference number 550. As shown, assume that the EAS message is an alert for a severe thunderstorm, and includes message information indicating a date and time of initial message delivery, and an amount of time that has passed since initial message delivery. In this way, the user may be able to determine a relevance of the EAS message based on an age of the EAS message.

As further shown, set-top box 210 may provide an option for the user to retain the EAS message (e.g., to cause set-top box 210 to continue to store the EAS message) or to delete the EAS message (e.g., to cause set-top box 210 to remove the EAS message from storage). In this way, the user may cause set-top box 210 to continue to store EAS messages (e.g., for viewing by other users of set-top box 210), or to delete EAS messages (e.g., to free up storage space on set-top box 210).

As indicated above, FIGS. 5A and 5B are provided merely as an example. Other examples are possible and may differ from what was described with regard to FIGS. 5A and 5B.

FIGS. 6A-6D are diagrams of another example implementation 600 relating to example process 400 shown in FIG. 4. FIGS. 6A-6D show another example of providing a stored EAS message after initial delivery of the EAS message.

Figure 6A:
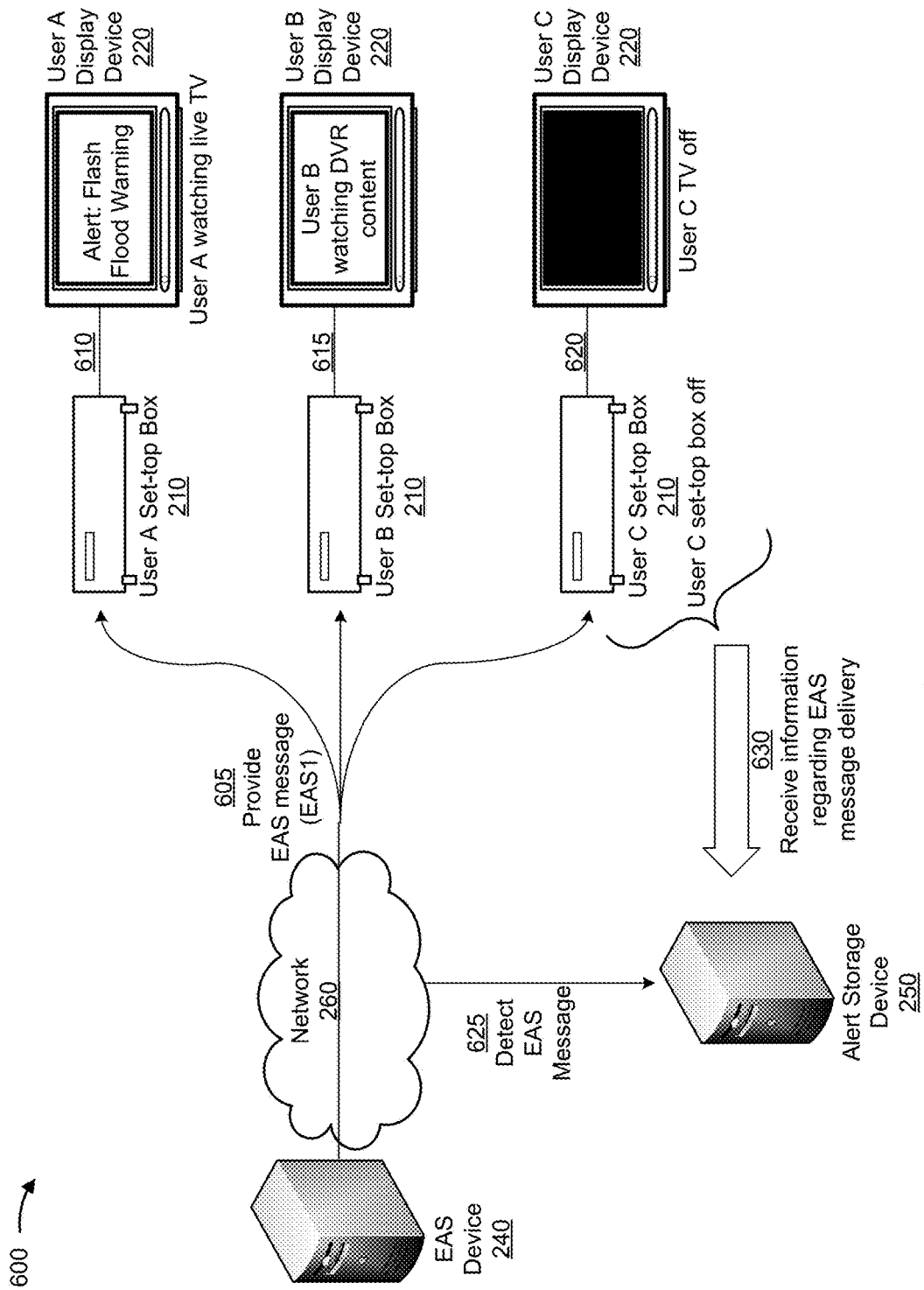
FIGS. 6A-6D are diagrams of another example implementation relating to the example process shown in FIG. 4.

As shown in FIG. 6A, and by reference number 605, assume that EAS device 240 provides an EAS message, identified as "EAS1," to a first set-top box 210 associated with User A, to a second set-top box 210 associated with User B, and to a third set-top box 210 associated with User C. As shown by reference number 610, assume that User A is watching live television, and that User A's set-top box 210 successfully delivers the EAS message for display on User A's display device 220 (e.g., "Alert: Flash Flood Warning").

As shown by reference number 615, assume that User B is watching DVR content, and that User B's set-top box 210 fails to deliver the EAS message for display on User B's display device 220. As shown by reference number 620, assume that User C's set-top box 210 and/or User C's display device 220 is powered off. Thus, the EAS message is not successfully delivered for consumption by User C.

As shown by reference number 625, alert storage device 250 detects that the EAS message was provided by EAS device 240. As shown by reference number 630, alert storage device 250 receives information regarding EAS message delivery (e.g., a message delivery indication) from set-top boxes 210 associated with User A and User B. Further, alert storage device 250 does not receive any indication from set-top box 210 associated with User C. For example, alert storage device 250 may query each set-top box 210 after detecting that the EAS message was provided by EAS device 240 (e.g., immediately after detecting the EAS message, a threshold amount of time after detecting the EAS message, etc.). Additionally, or alternatively, after determining whether the EAS message was successfully delivered, one or more set-top boxes 210 may provide the message delivery indication to alert storage device 250.

Figure 6B:
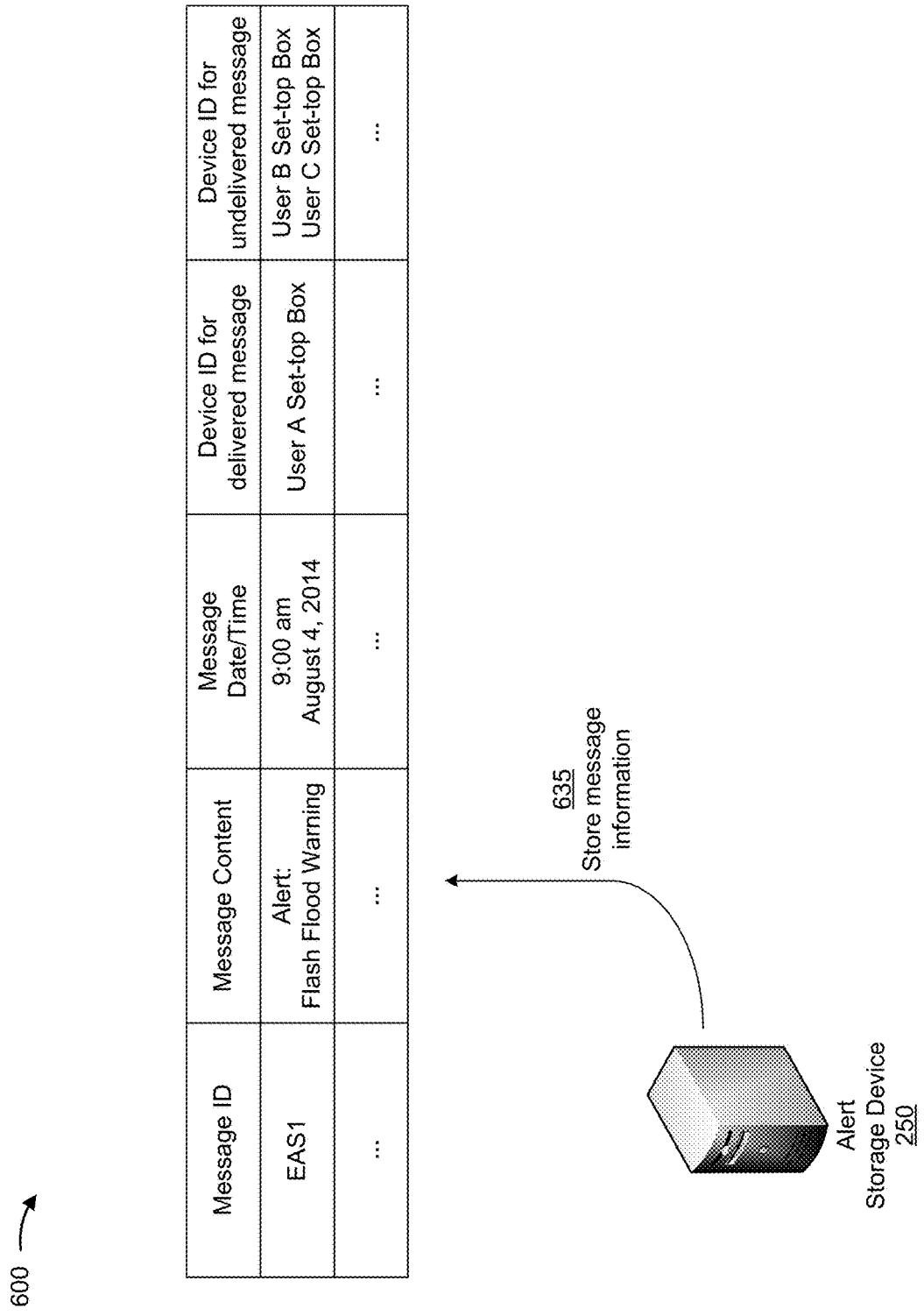

As shown in FIG. 6B, and by reference number 635, alert storage device 250 stores message information remotely from set-top boxes 210. As shown, assume that alert storage device 250 stores a message identifier (e.g., "EAS1"), message content (e.g., "Alert: Flash Flood Warning."), a date/time of initial message delivery (e.g., "9:00 am, Aug. 4, 2014"), a set of device identifiers that identify devices that successfully delivered the EAS message (e.g., "User A STB"), and a set of device identifiers that identify devices that failed to deliver the EAS message (e.g., "User B STB, User C STB").

Figure 6C:
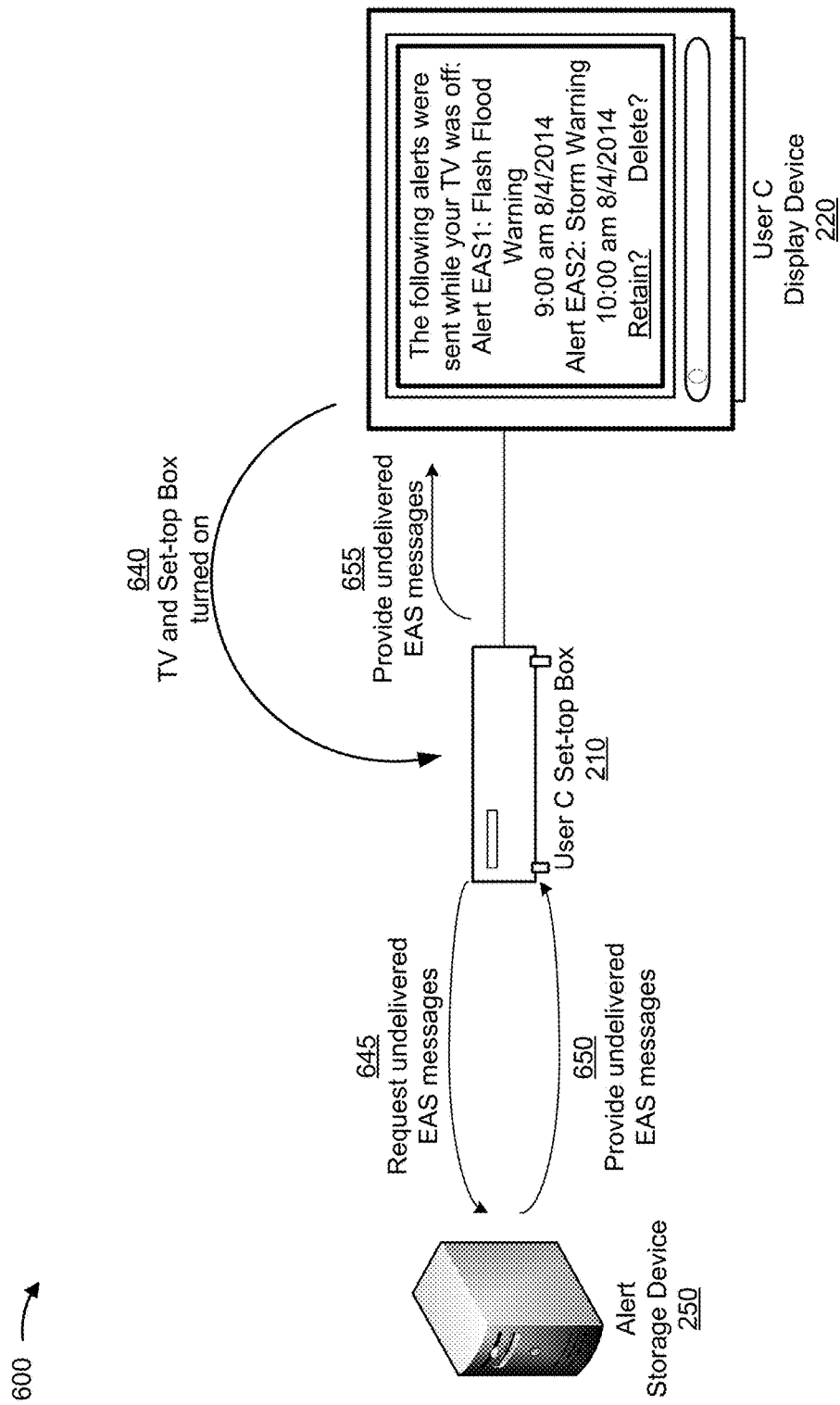

As shown in FIG. 6C, and by reference number 640, assume that User C's set-top box 210 is powered on, and that User C's set top box 210 determines that User C's display device 220 has been powered on. Based on this determination, User C's set-top box 210 requests undelivered EAS messages associated with User C and/or User C's set-top box 210, as shown by reference number 645. Based on this request, alert storage device 250 identifies (e.g., by searching a data structure) EAS messages that have not been delivered for consumption by User C, and provides the undelivered EAS messages to User C's set-top box 210, as shown by reference number 650.

As shown by reference number 655, User C's set-top box 210 provides the undelivered EAS messages for display by User C's display device 220. Assume that two EAS messages were initially delivered while User C's display device 220 was powered off. Thus, display device 220 provides the two EAS messages, shown as "EAS1" and "EAS2," for display. In this way, the user may view multiple EAS messages that the user has not previously consumed. In some implementations, User C's set-top box 210 may provide an indication, to alert storage device 250, that the EAS messages were successfully delivered, and alert storage device 250 may update a data structure to indicate that the EAS messages (e.g., EAS1 and EAS2) were successfully delivered. In this way, alert storage device 250 may prevent a user from consuming the same EAS message multiple times.

Figure 6D:
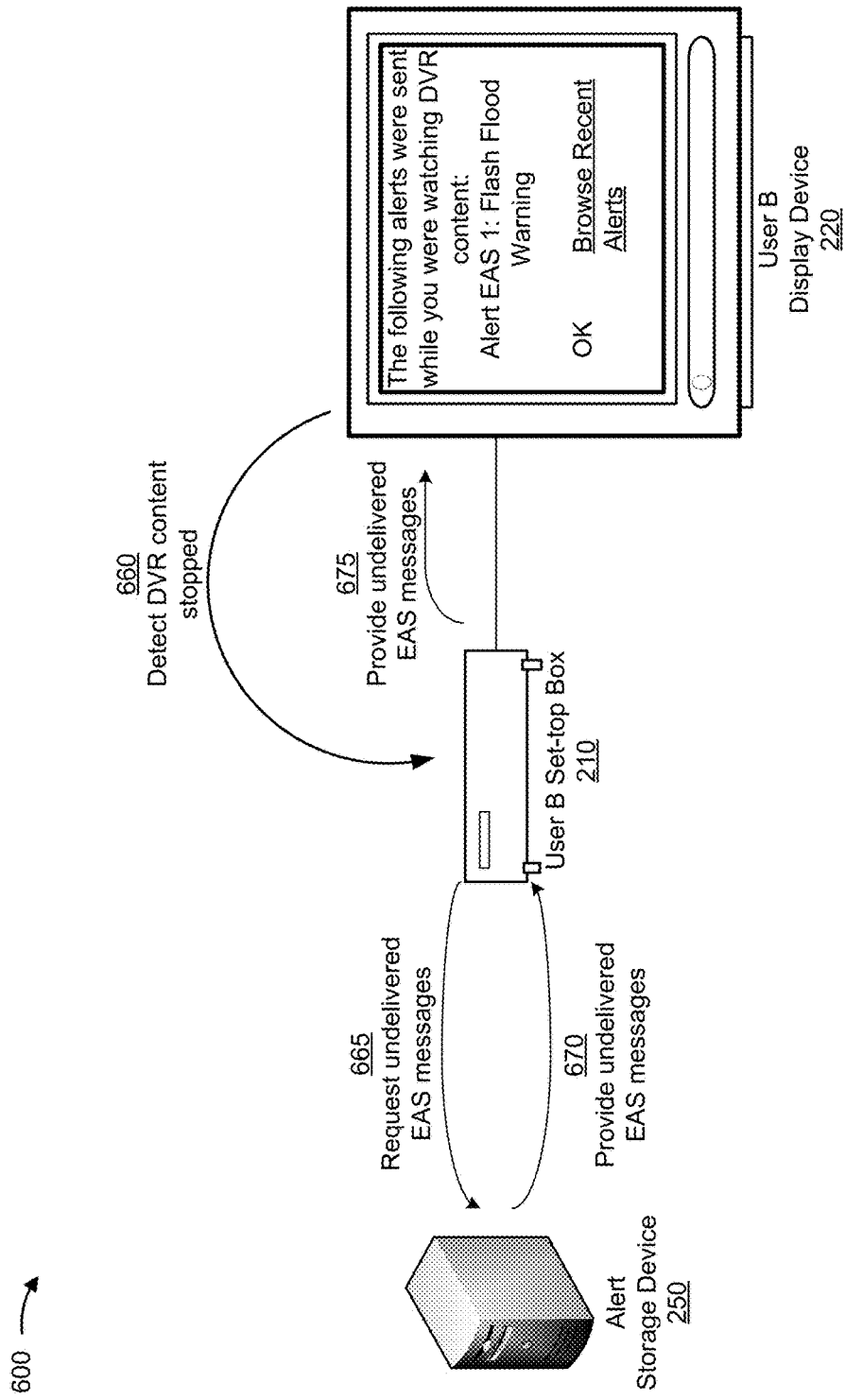

As shown in FIG. 6D, and by reference number 660, assume that User B's set-top box 210 determines that User B has switched from watching DVR content to live content. Based on this determination, User B's set-top box 210 requests undelivered EAS messages associated with User B and/or User B's set-top box 210, as shown by reference number 665. Based on this request, alert storage device 250 identifies (e.g., by searching a data structure) EAS messages that have not been delivered for consumption by User B, and provides the undelivered EAS messages to User B's set-top box 210, as shown by reference number 670. Additionally, or alternatively, User B's set-top box 210 may store the EAS message locally.

As shown by reference number 675, User B's set-top box 210 provides the undelivered EAS messages for display by User B's display device 220. Assume that one EAS message was initially delivered while User B was watching DVR content. Thus, display device 220 provides the EAS message, shown as "EAS1," for display. As further shown, assume that User B's set-top box 210 provides the user with an option to browse recent EAS messages. Selection of this option may cause User B's set-top box 210 to provide a list of EAS messages initially delivered in a particular time period. The user may navigate the list to select an EAS message to view, and User B's set-top box 210 may obtain and provide the selected EAS message. In this way, the user can check for alerts that the user may have missed or forgotten.

As indicated above, FIGS. 6A-6D are provided merely as an example. Other examples are possible and may differ from what was described with regard to FIGS. 6A-6D.

Figure 7:
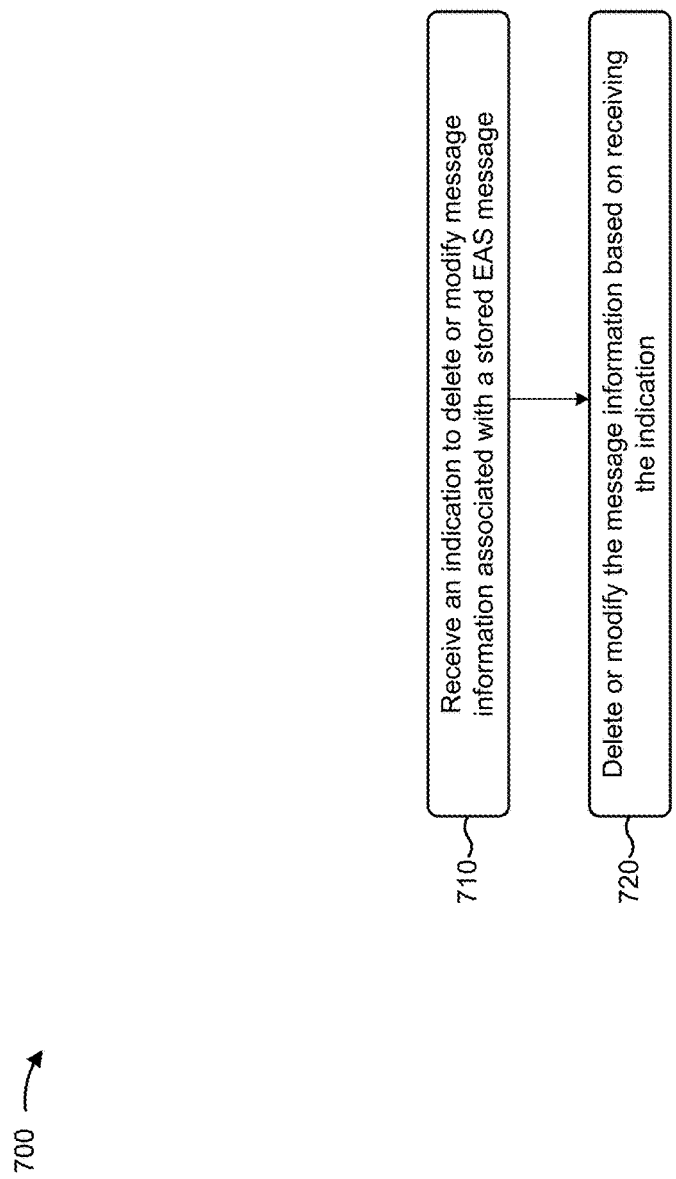
FIG. 7 is a flow chart of an example process for deleting or modifying information associated with a stored EAS message.

FIG. 7 is a flow chart of an example process 700 for deleting or modifying information associated with a stored EAS message. In some implementations, one or more process blocks of FIG. 7 may be performed by message delivery device 210. In some implementations, one or more process blocks of FIG. 7 may be performed by another device or a group of devices separate from or including message delivery device 210, such as message output device 220, user device 230, EAS device 240, and/or alert storage device 250.

As shown in FIG. 7, process 700 may include receiving an indication to delete or modify message information associated with a stored EAS message (block 710), and deleting or modifying the message information based on receiving the indication (block 720). For example, message delivery device 210, user device 230, and/or alert storage device 250 may receive an indication to delete and/or modify message information associated with a stored EAS message. In some implementations, message delivery device 210, user device 230, and/or alert storage device 250 may successfully deliver an EAS message, and/or may receive an indication that an EAS message has been successfully delivered. In this case, message delivery device 210, user device 230, and/or alert storage device 250 may delete the stored EAS message and/or message information associated with the stored EAS message.

Additionally, or alternatively, message delivery device 210, user device 230, and/or alert storage device 250 may determine that an EAS message has expired, and may delete the EAS message based on the expiration. For example, message delivery device 210, user device 230, and/or alert storage device 250 may determine that a threshold amount of time has passed since the EAS message was initially delivered, since the EAS message was stored, or the like. As another example, message delivery device 210, user device 230, and/or alert storage device 250 may determine that an EAS message has expired based on the content of the EAS message. For example, the EAS message may indicate that a flash flood warning is in effect until 9:00 PM. Message delivery device 210, user device 230, and/or alert storage device 250 may determine that the current time is past 9:00 PM, and may delete the EAS message based on this determination.

In some implementations, alert storage device 250 may store a set of message delivery indicators that indicate which users and/or devices have received the EAS message, or that indicates which users and/or devices have not received the EAS message. In this case, alert storage device 250 may modify a message delivery indicator, for a particular EAS message and associated with a user and/or a device, based on determining that the user and/or device has received the particular EAS message. In this way, alert storage device 250 may keep track of users and/or devices that have not received the EAS message so that the EAS message may be provided to these users and/or devices in the future.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
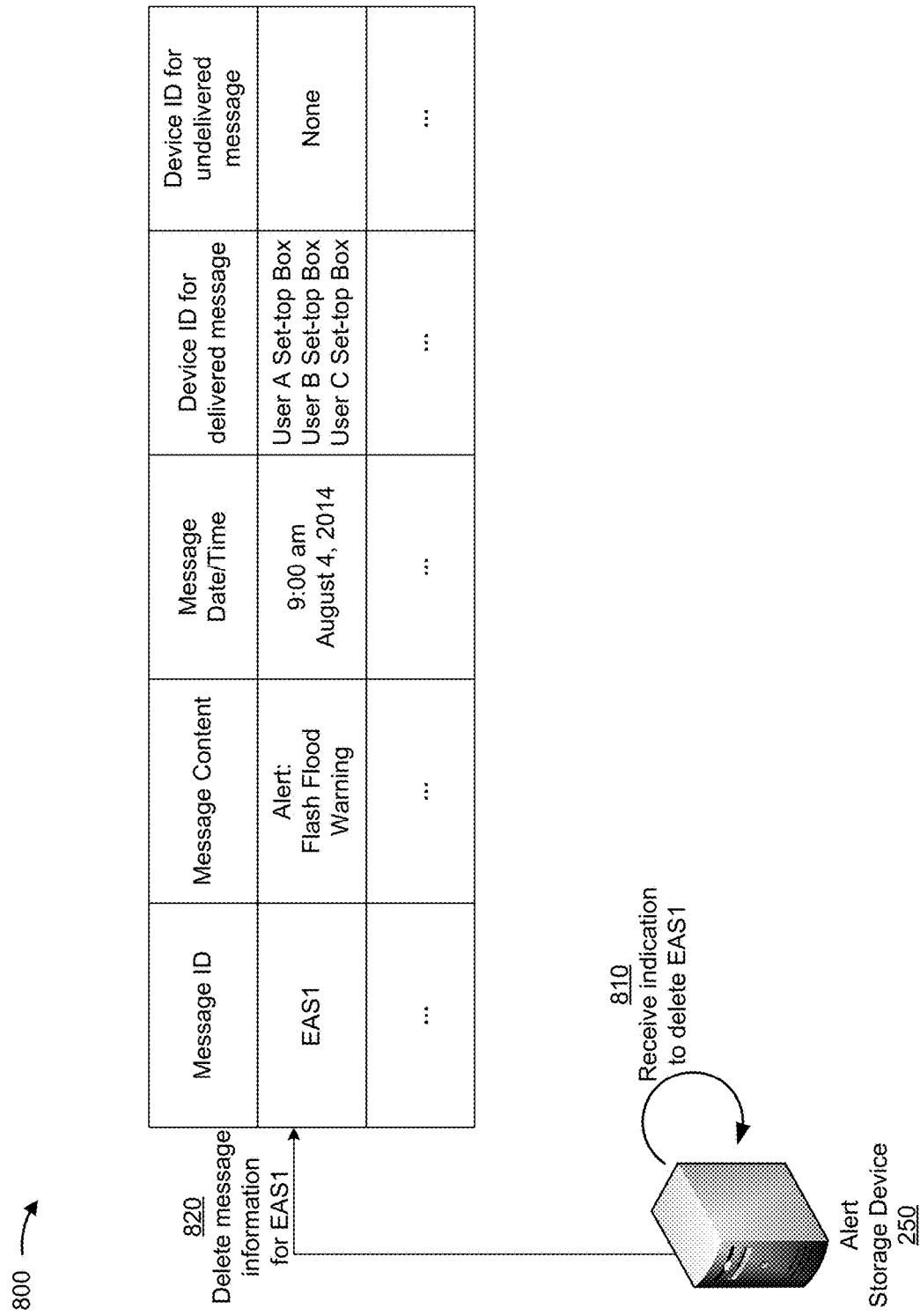
FIG. 8 is a diagram of an example implementation relating to the example process shown in FIG. 7.

FIG. 8 is a diagram of an example implementation 800 relating to example process 700 shown in FIG. 7. FIG. 8 shows an example of deleting or modifying information associated with a stored EAS message. For the purpose of FIG. 8, assume that the operations described herein in connection with FIGS. 6A-6D have been performed.

As shown in FIG. 8, and by reference number 810, assume that alert storage device 250 receives an indication to delete an EAS message identified as EAS1. For example, assume that all set-top boxes, shown as User A set-top box, User B set-top box, and User C set-top box, have received and successfully delivered EAS message EAS1. Based on this, alert storage device 250 determines to delete EAS message EAS1 and message information associated with EAS message EAS1. As another example, alert storage device 250 may determine to delete the message information based on expiration of EAS1. As shown by reference number 820, assume that alert storage device 250 deletes EAS1 and message information associated with EAS1 from a data structure in which this information is stored. In this way, alert storage device 250 may save storage space by retaining recent and/or undelivered EAS messages.

As indicated above, FIG. 8 is provided merely as an example. Other examples are possible and may differ from what was described with regard to FIG. 8.

Implementations described herein assist in storing EAS messages so that an EAS message may be delivered for consumption by a user after the EAS message was initially delivered. Furthermore, implementations described herein assist in providing delivery confirmation for EAS messages. In this way, important EAS messages may reach more users.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory to store instructions; and
one or more processors, to execute the instructions in the memory, to:
  detect an emergency alert system message,
    the emergency alert system message including a message to be provided to an output device, and
    the emergency alert system message not being delivered by the output device, when the output device is delivering pre-recorded content;
  store the emergency alert system message, for future delivery when the emergency alert system message is not delivered by the output device;
  receive, after storing the emergency alert system message, an indication that the output device switched from delivering the pre-recorded content to delivering live content; and
  provide, based on receiving the indication, the emergency alert system message to the output device.

2. The device of claim 1, where the one or more processors are further to:
provide the emergency alert system message to a user device associated with a user; and
determine that the emergency alert system message has not been received by the user device,
  the user device being capable of providing live content and the emergency alert system message to the user; and
store the emergency alert system message based on determining that the emergency alert system message has not been received by the user device.

3. The device of claim 1, where the one or more processors are further to:
determine that a user device, associated with a user and to which the emergency alert system message is to be delivered, is powered off; and
store the emergency alert system message based on determining that the user device is powered off.

4. The device of claim 1, where the one or more processors are further to:
receive another indication that a user device, associated with a user, is within a communicative proximity with respect to the device; and
provide the emergency alert system message based on receiving the other indication that the user device is within the communicative proximity with respect to the device.

5. The device of claim 1, where the emergency alert system message includes at least one of:
a weather alert;
a missing person alert;
a crime alert; or
a news alert.

6. The device of claim 1, where the one or more processors are further to:
determine that the emergency alert system message has expired based on content of the emergence alert system message and
delete, from storage, the emergency alert system message based on determining that the emergency alert system message has expired.

7. The device of claim 1, where the one or more processors are further to:

receive another indication that the emergency alert system message was successfully delivered after providing the emergency alert system message to the output device; and delete, from storage, the emergency alert system message based on receiving the other indication that the emergency alert system message was successfully delivered.

8. A computer-readable medium storing instructions, the instructions comprising:
one or more instructions that, when executed by one or more processors of a device, cause the one or more processors to:
receive an emergency alert system message,
the emergency alert system message including a message to be provided to an output device, and
the emergency alert system message not being delivered by the output device, when the output device is delivering pre-recorded content;
store the emergency alert system message, for future delivery when the emergency alert system message is not delivered by the output device;
receive, after storing the emergency alert system message, an indication that the output device switched from delivering the pre-recorded content to delivering live content; and
provide, based on receiving the indication, the emergency alert system message to the output device.

9. The computer-readable medium of claim 8, where the instructions further comprise:
one or more instructions that, when executed by the one or more processors, cause the one or more processors to:
receive, from a user device associated with a user, another indication that the emergency alert system message has not been presented to the user device;
determine that the emergency alert system message has not been presented based on receiving the other indication that the emergency alert system message has not been presented to the user device; and
provide the emergency alert system message to the user device based on determining that the emergency alert system message has not been presented.

10. The computer-readable medium of claim 8, where the instructions further comprise:
one or more instructions that, when executed by the one or more processors, cause the one or more processors to:
store an association between the emergency alert system message and an identifier that identifies a user;
receive the identifier;
identify the emergency alert system message based on the identifier and the association between the emergency alert system message and the identifier; and
provide the emergency alert system message for presentation based on identifying the emergency alert system message.

11. The computer-readable medium of claim 8, where the instructions further comprise:
one or more instructions that, when executed by the one or more processors, cause the one or more processors to:
receive another indication that the emergency alert system message was successfully delivered after providing the emergency alert system message; and
delete, from storage, the emergency alert system message based on receiving the other indication that the emergency alert system message was successfully delivered.

12. The computer-readable medium of claim 8, where the instructions further comprise:
one or more instructions that, when executed by the one or more processors, cause the one or more processors to:
determine that a threshold amount of time has elapsed since the emergency alert system message was received or stored; and
delete, from storage, the emergency alert system message based on determining that the threshold amount of time has elapsed.

13. The computer-readable medium of claim 8, where the instructions further comprise:
one or more instructions that, when executed by the one or more processors, cause the one or more processors to:
store a message delivery indicator that indicates that the emergency alert system message has not been presented; and
modify the message delivery indicator, to indicate that the emergency alert system message has been presented, based on providing the emergency alert system message to the output device.

14. The computer-readable medium of claim 8, where the instructions further comprise:
one or more instructions that, when executed by the one or more processors, cause the one or more processors to:
provide the message for presentation to another device associated with the device.

15. A method, comprising:
detecting, by a device, an emergency alert system message,
the emergency alert system message including content to be broadcast to an output device, and
the emergency alert system message not being delivered by the output device, when the output device is delivering pre-recorded content;
storing, by the device, the emergency alert system message, for future delivery, when the emergency alert system message is not delivered by the output device;
receiving, by the device and after storing the emergency alert system message, an indication that the output device switched from delivering the pre-recorded content to delivering live content; and
providing, by the device and based on receiving the indication, the emergency alert system message to the output device.

16. The method of claim 15, further comprising:
receiving another indication that a user has interacted with a message delivery prompt; and
presenting the emergency alert system message based on receiving the other indication that the user has interacted with the message delivery prompt.

17. The method of claim 15, further comprising:
providing the emergency alert system message for presentation to another device associated with the device.

18. The method of claim 15, further comprising:
providing the emergency alert system message, for presentation, to a user device associated with a user.

19. The method of claim 15, further comprising:

determining that the emergency alert system message has expired based on the content of the emergency alert system message; and deleting, from storage, the emergency alert system message based on determining that the emergency alert system message has expired based on the content of the emergency alert system message.

20. The method of claim 15, further comprising:

storing an association between the emergency alert system message and an identifier that identifies a user;

receiving the identifier;

identifying the emergency alert system message based on the identifier and the association between the emergency alert system message and the identifier; and presenting the emergency alert system message based on identifying the emergency alert system message.

\* \* \* \* \*